3,016,339
Patented Jan. 9, 1962

3,016,339
METHOD OF PROTECTING METAL SURFACES
Marcel Riou, Neuilly, and Henri Richaud, Chambery, France, assignors to Pechiney Compagnie de Produits Chimiques et Electrometallurgiques, Paris, France, No Drawing. Filed Apr. 9, 1958, Ser. No. 727,247
Claims priority, application France Apr. 12, 1957
8 Claims. (Cl. 204—38)

The invention relates to a new method for protecting metal surfaces, involving a new use of chemical compounds therefor.

Numerous methods are known in the art of protecting metallic surfaces; thus, it is well known to coat a metallic surface with a resin film, or to cover the surface with a layer of oxide or other compounds and impregnating that layer eventually with certain agents which are usually referred to as "sealing agents" in the art.

Inorganic protective layers which are obtained by oxidation, phosphatation, sulfurization, chromatization, or other chemical or electrolytical operations, are improved also by such treatments as, in particular in the case of oxides formed on light metals, dipping into boiling water or treatment with alkaline solutions, silicates, fatty acids, sulfonated fatty acids, and the like.

The particular process to be employed in each case depends largely upon the conditions under which the desired protection treatment is to be carried out. A frequent difficulty is that of obtaining a sufficiently adherent protective coating which is at the same time tough, impermeable to corrosive agents and resistant to the latter.

Another drawback of electrolytically protective layers formed on metal surfaces, is a certain typical odor.

Yet another drawback of the known methods of treating protective layers on metal surfaces with sealing or similar agents is the requirement of applying high temperatures, of at least 50° C. and usually much higher, above 100° C., which high temperatures are not withstood by many protective layers, for instance by those containing dyes. Furthermore, many known sealing agents impart to the sealed protective layer on the surface of a metallic article a certain taste and/or a degree of toxicity which makes it impossible to use such articles in many industries.

It is, therefore, an object of the present invention, to provide an important improvement which makes it possible to obtain inorganic protective layers as the surfaces of metallic articles, which offer an increased resistance to wear and to corrosion which are free from the undesirable odor of electrolytically produced oxide layers.

It is another object of our invention to provide a method for determining the degree of moisture receptiveness and retentiveness of a protective layer on a metallic surface by diminishing or enhancing the same as desired.

It is a further object of our invention to provide for metallic surfaces protected with inorganic coatings which have an attractive, decorative appearance, and show an improved property of causing the safe adherence of paints, varnishes, or plastic films thereon.

It is further an object of the invention to provide a method of sealing protective metallic surfaces bearing an inorganic coating susceptible to heat treatment, by treating the latter coating at temperatures below 50° C.

It is finally an object of the invention to provide a method of sealing the protective inorganic, preferably oxidic coatings on the surfaces of metallic objects destined for use in the food industry and/or as kitchen articles, which method permits to obtain sealed coatings that are non-toxic, tasteless, and odorless.

The new method according to our invention, which permits to avoid the above-mentioned drawbacks, and achieves the aforesaid objects, is based on our discovery that the adsorption of an organic substance as a sealing agent in an inorganic layer on the surface of a metal is particularly strong and shows the above-mentioned excellent properties, when the sealing agent used is an organic polyacid compound consisting of molecules which fulfill a number of conditions:

(1) Each molecule of the polyacid sealing agent according to the invention must contain a chain of at least two carbon atoms being linked to each other by a saturated bond, i.e. one electron pair.

(2) Each molecule of the sealing agent must contain at least two electro-negative substituents which are preferably two acidic groups such as the carboxylic group —COO—, the sulfonic group —SO$_3$—, or the phosphonic group —PO$_3$=; for example, when containing simultaneously carboxylic groups —COO— and sulfonic groups —SO$_3$—, there will, of course, be at least one of each of these groups in the molecule of the sealing agent, but it is preferable that there be more than two of either or of both of these acidic groups present in the molecule.

(3) The term "acidic group" as used in this application is intended to comprise all acidic groups mentioned under (2) including the carboxylic groups either as free acid groups or combined in the form of their salts such as alkaline metal, ammonium or amine salts or their esters.

(4) The molecule of the sealing agent according to the invention must contain electro-positive groups in addition to the aforesaid acidic group or groups, and the number of the electro-positive groups should be preferably a large one, exceeding two, when the molecule contains —OH, —CHO or —NH$_2$ as electro-positive groups. Optimal results are obtained when the number of these groups is much larger as, for instance, in the case of the acidic derivatives of sugars, starch, celluloses or related carbohydrate acids such as celluronic, polymanuronic (alginic), polyglycuronic, polygalacturonic, and the like acids.

(5) The molecule may contain as branches alkyl or aryl radicals; it is preferable that the molecular weight of such radicals is above 15, i.e. heavier than the methyl group CH$_3$ and preferably above 29 (C$_2$H$_5$); two or more of these branches may be constituted by the aforesaid carboxylic groups in accordance with (2).

(6) The above defined sealing agents should have molecular weights greater than 200 and preferably exceeding 450. Optimal results are achieved with sealing agents having a molecular weight exceeding 900, while the upper limit for the molecular weight is determined only by the requirement of solubility of the agent in water or in an organic solvent.

(7) The organic substance serving as a sealing agent in the method according to the invention, should be at least slightly soluble to permit its application to the metal surface to be protected. Weak solutions either in water or in an organic solvent, in which the sealing agent is present in amounts of at least 0.01% by weight, can be used, while concentrations of 0.1% to 15% by weight are preferred.

(8) The branches mentioned under (3) may also comprise the nitrile radical —CN.

(9) When referring hereinafter to "hydroxyl groups," it should be understood that this term is intended to comprise free —OH groups as well as combined groups which can be etherized, for instance methoxy groups —OCH$_3$ or esterified, or combined in a different manner, for instance by a metal atom replacing the hydrogen atom in the —OH group.

The most appropriate substance, from a commercial point of view, for preparing a sealing bath according to our invention, are those substances complying with the aforesaid conditions, which contain a substantial number of hydroxyl groups per molecule, as well as, eventually, additional —CHO groups, and which are acidic derivatives of cellulose, dextrin, starch, sugars, polyvinylic alcohols; very efficient and commercially easily available substances are acids of the polyuronide class such as, in particular, alginic acid and its derivatives.

Furthermore, salts or esters of carboxy-methyl-celluloses are well suited for the purpose of the invention. In these products, the glycolic acid may be entirely or partially replaced by one or more of its homologues, cellulose-methyl-glycolic acid, cellulose-propionic acid, cellulose-butyric acid, cellulose-glyceric acid and the like being representative of this group of compounds.

In order to prevent changes due to decomposition of aqueous solutions of the aforesaid OH-groups containing substances, it is often advisable to add to the solutions fermentation controlling substances, such as formaldehyde, phenol, thymol, pine oil, sodium benzoate, sodium pentachlorophenate, sodium orthophenylphenate, sodium fluosilicate and the like preserving agents.

Other substances suitable, for carrying out the present invention, are constituted by less or more water soluble polyesters. These compounds contain —COO— groups, generally combined, —OH— groups, totally or partially combined, and eventually other radicals or substituents. Particularly favourable results are obtained with polyesters issuing from the reaction of various acids such as: oxalic, malonic, maleic, succinic, glutaric, adipic, azelaic, sebacic, malic, tartric, saccharic, citric, quinoleic, phtalic, isophtalic, terephtalic, tetralic, chlorophtalic, orthophenylene diacetic, endomethylene-tetrachlorophtalic, etc., with such alcohols as: ethylene glycol, propylene glycol, butylene glycol, polyoxyethylenes, polyoxypropylenes, and compounds of oxyethylene and oxypropylene, glycerol, erythrites, pentaerythrite, arabitol, xylitol, sorbitol, quercitol, inositol, etc.

Practically the simplest manner of treating inorganic layers on metallic surfaces with the described substances consists in dipping the metal articles to be treated into solutions of one or more of said substances, for a length of time such that the surface layer of the article absorbs a certain amount of the substance; after the withdrawal of the article from the soultion, the excess of the latter is removed from the treated surface which is generally rinsed, so that only the amount of directly adsorbed sealing substance remains therein.

In general, the increase of the weight of an article when treated by the process according to the invention is from 0.1 gram to 15 grams per square meter of the treated surface. In most cases, this increase is comprised between 1 gram and 5 grams per square meter.

The treatment may also be carried out by spreading or spraying the solutions on the surface of the article, and when draining or wiping, and generally rinsing it.

It is preferred that the protective organic polyacids are in the form of their salts or esters. The choice of an adequate pH is very important for carrying out the new method successfully because the velocity of the fastening of the substance in the adsorbant layer, as well as the qualities of the layer treated, depend upon the pH of the solution; on the other hand, the optimum value of pH varies in relation with the nature of the inorganic layer and with that of the selected sealing agent. When the inorganic layer comprises oxides of trivalent metals such as aluminum, it is in general advisable to work in the vicinity of pH=7, but the admissible range of pH extends at least between 4 and 9, and preferably between 5 and 8.

According to the nature of the articles and the substances involved, the solution may comprise as a solvent, water or one or more organic liquids such as, for example, alcohols, chlorinated hydrocarbons, esters, ketones and the like; mixtures of water with organic liquids are suitable as solvents particularly in those cases where the sealing agent is not sufficiently soluble in water alone.

From an economical point of view, aqueous solutions are preferred.

Highly improved surfaces can be obtained by using solutions containing together several of the sealing agents according to the invention.

The treatment may be effected at temperatures extending from room temperature up to 100° C. in the case of aqueous solutions, and even above 100° C. when higher boiling solvents are used. It is, however, possible and preferred to carry out the sealing operation at temperatures below 50° C., for example, between 15° C. and 40° C.; this constitutes an important advantage over the known processes which generally require much higher temperatures which are, for instance, harmful for dyes often used for the purpose of coloring metallic surfaces; moreover, certain layers of inorganic substances produced on metal surfaces suffer from an increase of temperature; in these cases, the method of our invention has the important advantage of permitting treatment at low temperatures.

While the salts of the acidic groups of the sealing substances used in the method according to our invention are chiefly those of sodium, potassium, and ethanolamine, other metals or amines may also be used, provided the respective salts are sufficiently soluble; for example, Mg, Li, Ca, Al, Zn, Fe, Mn or other metal salts may be used, when their solubility exceeds 0.01%. Similarly, esters of a number of alcohols, such as methylic, ethylic, propylic or butylic alcohols, glycols, triols and the like as well as phenols may replace the first named salts.

The method of our invention may be applied to all metals capable of being coated with a thin layer of an adsorbent inorganic substance such as, for instance, the oxide of the base metal itself. The method according to the invention is, therefore, applicable to the surfaces of iron and related metals, light metals such as aluminum, titanium, zinc, copper, zirconium, and other metals, as well as the alloys of these metals.

The metal articles provided with a surface-protecting, inorganic coating which has been sealed in a sealing bath containing a sealing agent of the kind described hereinbefore, according to the method of our invention, are particularly suited for use in the food industry or as kitchen articles because the sealed layers are free from toxicity and tasteless and odorless. These layers also show an adequate water retentiveness.

The invention will be further illustrated by a number of examples given below, which are, however, not meant to be limitative in any way.

*Example I*

A plate of commercial aluminum is degreased with the aid of trichloroethylene, then rinsed and finally anodically oxidized in a sulfuric bath containing 20% by weight of $H_2SO_4$ of 66° Bé.; the electrolysis is performed at 20° C. during 30 minutes with a current density of 1.5 ampere per square decimeter. The plate is then rinsed and dyed by immersion in a dyeing bath of 5 grams per liter of Bordeaux Aluminum RL (a dyestuff manufactured by Durand & Huguenin of Basel, Switzerland); the dyeing is carried out at 63° C. and it lasts about 10 minutes. After washing, the plate is dipped for 30 minutes in a boiling aqueous solution containing 10 g./l. of sodium alginate, and 0.5 g./l. of sodium fluosilicate as an adjuvant. This solution has a pH of about 6.8 and its absolute viscosity is 150 centipoises at 20° C. After the plate is rinsed again and dried, it has a very smooth surface, its resistance to corrosion is excellent and it is very suitable for use in manufacturing articles for food industry.

*Example II*

A treatment similar to that described in Example I is applied to a plate made of an aluminum base alloy containing 3% magnesium; the sealing bath according to the invention contains, per liter, 5 g. of sodium alginate, the absolute viscosity of which amounts to 500 centipoises (cps.) when determined in a 1% aqueous solution at 20° C. The bath solution also contains 0.1 g./l. of sodium orthophenylphenate used as a preserving agent; the pH of the solution is maintained at about 6.6.

*Example III*

An article made of an aluminum base alloy containing about 4% copper, 0.6% magnesium and 0.5% manganese, is oxidized as described in Example I, and then treated during 30 minutes at 100° C., with an aqueous solution containing 10 g. of propylene glycol alginate per liter. The solution has, at 20° C., an absolute viscosity of 200 cps. During the treatment, its pH is about 4.2. The sealing treatment leads to a very satisfactory result, the sealed plate being non toxic and corrosion resistant, while conventional sealing methods do not give such results with copper containing aluminum alloys.

*Example IV*

Example I is repeated, but an aqueous sealing bath is provided which contains, per liter, 1 g. of polyoxypropylene glycol alginate. This alginate is characterized by an absolute viscosity of 500 cps. when determined at 20° C., in a solution containing 1% thereof. The sealing both has a pH of about 4.7.

*Example V*

Sealing of the surface of a plate similar to that used in Example I, is effected by means of an aqueous solution of sodium cellulose glycolate containing 40 g. of this compound per liter, and also containing 0.5 g./l. of thymol. The aqueous solution having 2% of the sodium cellulose glycolate employed, has a viscosity of 20 cps. and the bath has a pH of 6.5.

*Example VI*

A plate which is previously oxidized as in Example I is sealed at 100° C. during 30 minutes, in an aqueous bath according to the invention, containing per liter 2 g. of the sodium salt of carboxy-methyl-cellulose. The bath shows, at 20° C., a viscosity of 250 cps. Its pH during the treatment is 6.3.

*Example VII*

The same bath as in the preceding example is used, but the plate is allowed to remain in the solution for one night at a bath temperature of 43° C. Similarly satisfactory results are obtained as in Example VI; moreover, the color and the general appearance of the treated plate is still more attractive (the plate having been dyed as in Example I).

*Example VIII*

A treatment, similar to that of Example VII, is carried out at 45° C. with an aqueous solution of 5 g. of sodium cellulose glycolate per liter of water. The viscosity of the solution is 35 cps. at 20° C. The pH of the bath during the treatment is 6.8.

*Example IX*

A plate of aluminum containing 99.5% Al is cleansed, degreased, and then anodically oxidized in a well known manner; after oxidation, the plate is rinsed and colored in a dyeing bath of "Indigosol Green I.B." (a dyestuff made by Durant & Huguenin of Basel, Switzerland), which is a sulfonic ester of the leuco-derivative of benzene-2, benzene-2'-dimethoxydibenzanthrone. The plate is then sealed by immersion for 2 hours, and at 80° C. in an aqueous solution of tridecaoxyethylene polyadipate having a molecular weight of about 1500. The solution contained 0.2% by weight of this polyester. After rinsing and drying, the plate showed a considerably improved resistance to corrosion.

It will be understood that while there have been given herein certain specific examples of the practice of this invention, it is not intended thereby to have this invention limited to or circumscribed by the specfic details of materials, proportions or conditions herein specified, in view of the fact that this invention may be modified according to individual preference or conditions without necessarily departing from the spirit of this disclosure and the scope of the appended claims.

What we claim is:

1. A method of sealing an adsorbent inorganic oxide protective layer which is produced on an oxidizable metallic surface by a chemical reaction with the metallic surface, which method comprises the steps subsequent to the formation of said inorganic protective layer of:

(a) immersing the metallic surface having the aforesaid inorganic layer in a sealing bath having a pH of 4–9, said sealing bath containing therein an organic polyacid compound having a molecular weight greater than 200, said compound being adsorbable by said inorganic protective layer and consisting of molecules, each of which comprises a chain of at least two carbon atoms linked to each other by saturated bond, at least two electro-negative substituents, at least one of which is an acidic group, and at least two electro positive groups;

(b) withdrawing the metal surface from said sealing bath;

(c) rinsing said withdrawn metallic surface with water to remove the excess of bath liquid unadsorbed by said inorganic layer from the latter; and (d) drying the resulting sealed surface.

2. The method of claim 1 wherein the sealing bath is at a temperature between 15° C. and the boiling point of the sealing bath.

3. The method of claim 1 wherein a sealing bath is at a temperature above 15° C. and below 50° C.

4. The method of claim 1 wherein the sealing bath is at a temperature of above 15° C. and below 50° C., and the sealing bath further comprises a fermentation preventing agent.

5. The process of claim 1 wherein the adsorbable molecules in said sealing bath contain at least two acidic groups which are free carboxylic groups.

6. The process of claim 1 wherein the metallic surface is aluminum and the adsorbable molecules in the sealing bath are selected from the group consisting of: sodium alginate, propylene glycol alginate, polyoxypropylene glycol alginate, sodium cellulose glycolate and tridecaoxyethylene polyadipate.

7. The process of claim 6, wherein the pH is 5–8.

8. Process of claim 7, wherein the pH is about 7.

References Cited in the file of this patent

UNITED STATES PATENTS

| | | |
|---|---|---|
| 608,363 | Erchelbaum | Aug. 2, 1898 |
| 2,158,485 | Preble | May 16, 1939 |
| 2,181,782 | Coppock | Nov. 28, 1939 |
| 2,231,373 | Schenk | Feb. 11, 1941 |
| 2,357,275 | Wachter | Aug. 29, 1944 |
| 2,589,313 | Wood | Mar. 18, 1952 |
| 2,678,891 | Jenkins | May 18, 1954 |
| 2,683,113 | Prance et al. | July 6, 1954 |
| 2,812,295 | Patrick | Nov. 5, 1957 |

FOREIGN PATENTS

| | | |
|---|---|---|
| 903,998 | France | Oct. 23, 1945 |

OTHER REFERENCES

Hercules: "Cellulose Gum" (1953), pages 7 and 18.